F. KAPLAN.
COLLAPSIBLE VEHICLE.
APPLICATION FILED JULY 1, 1908.

1,027,483.

Patented May 28, 1912.

4 SHEETS—SHEET 1.

Inventor:
Fredrick Kaplan
By Luther L. Miller.
Atty.

F. KAPLAN.
COLLAPSIBLE VEHICLE.
APPLICATION FILED JULY 1, 1908.

1,027,483.

Patented May 28, 1912.
4 SHEETS—SHEET 3.

Witnesses:
G. V. Domarus Jr.
B. F. Funk

Inventor:
Fredrick Kaplan
By Luther L. Miller
Atty

COLUMBIA PLANOGRAPH CO., WASHINGTON, D. C.

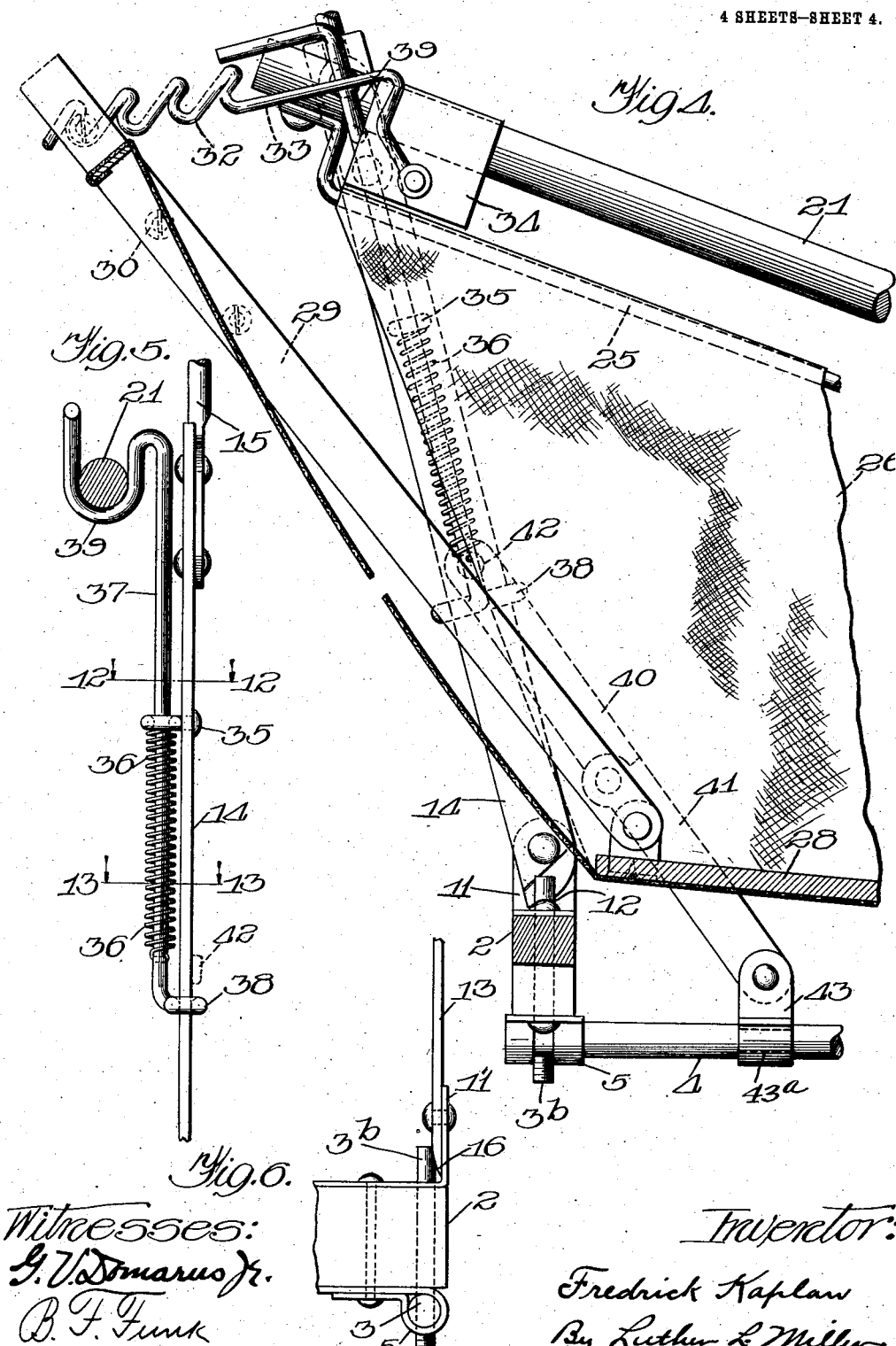

UNITED STATES PATENT OFFICE.

FREDRICK KAPLAN, OF BELOIT, WISCONSIN.

COLLAPSIBLE VEHICLE.

1,027,483.  Specification of Letters Patent.  Patented May 28, 1912.

Application filed July 1, 1908. Serial No. 441,275.

*To all whom it may concern:*

Be it known that I, FREDRICK KAPLAN, a citizen of the United States, residing at Beloit, in the county of Rock and State of Wisconsin, have invented certain new and useful Improvements in Collapsible Vehicles, of which the following is a specification.

This invention relates to collapsible vehicles and particularly to children's folding carriages and one of the objects is to provide means whereby the carriage may be conveniently collapsed for transportation and readily set up for use.

Another object of the invention is to provide means for conveniently and efficiently holding the collapsible parts rigid while the carriage is being used.

Another object is to provide means for resiliently supporting the sling or body portion of the vehicle.

Another object of the invention is to provide an adjustable back for the body portion of the vehicle, whereby the back may be adjusted to suit varying conditions.

Other objects and advantages, as well as the novel details of construction of the invention, will be specifically described hereinafter, it being understood that changes in form, proportion and minor details of construction may be resorted to without departing from the spirit of the invention or sacrificing any of the advantages thereof.

Figure 1:
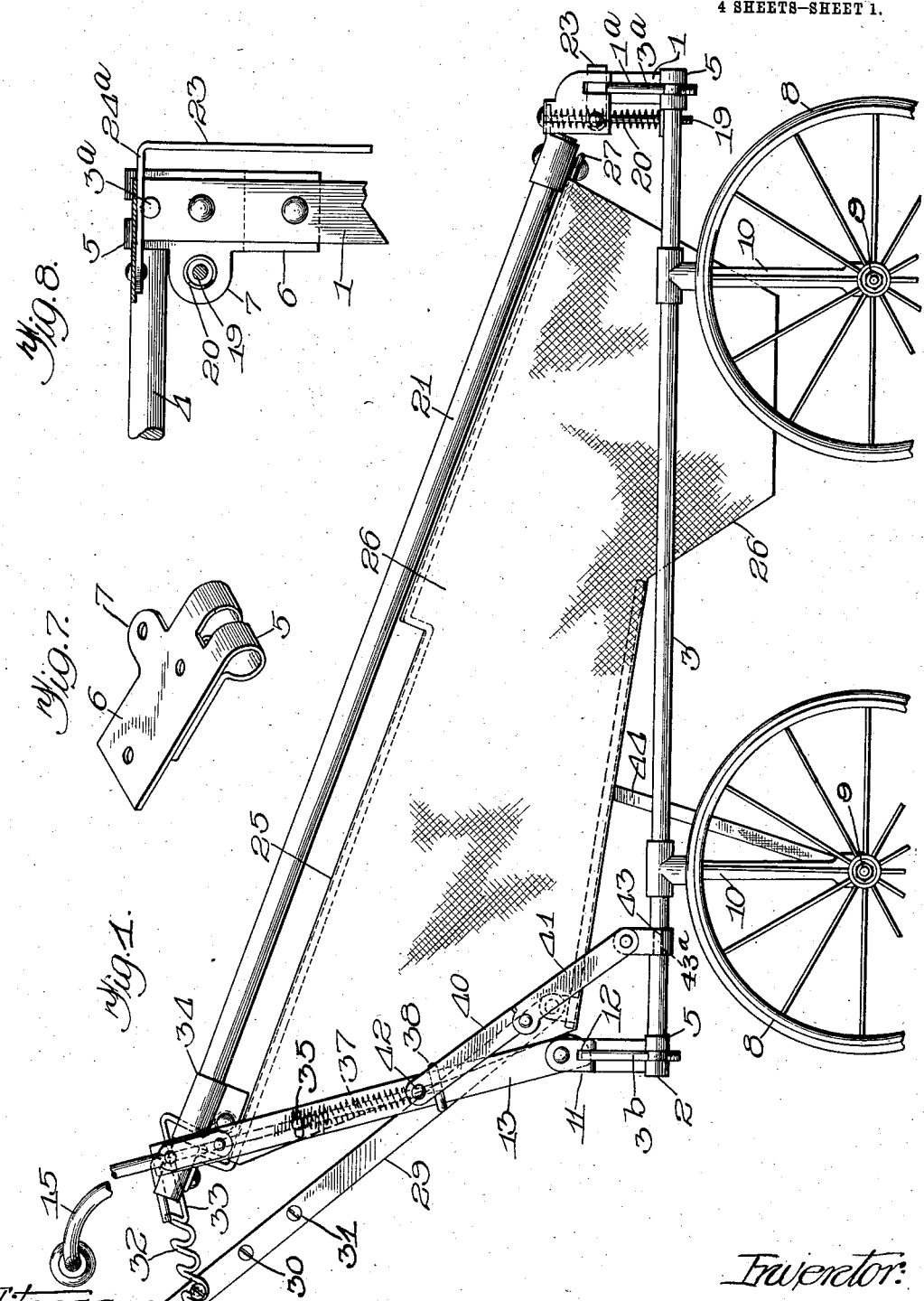
Figure 2:
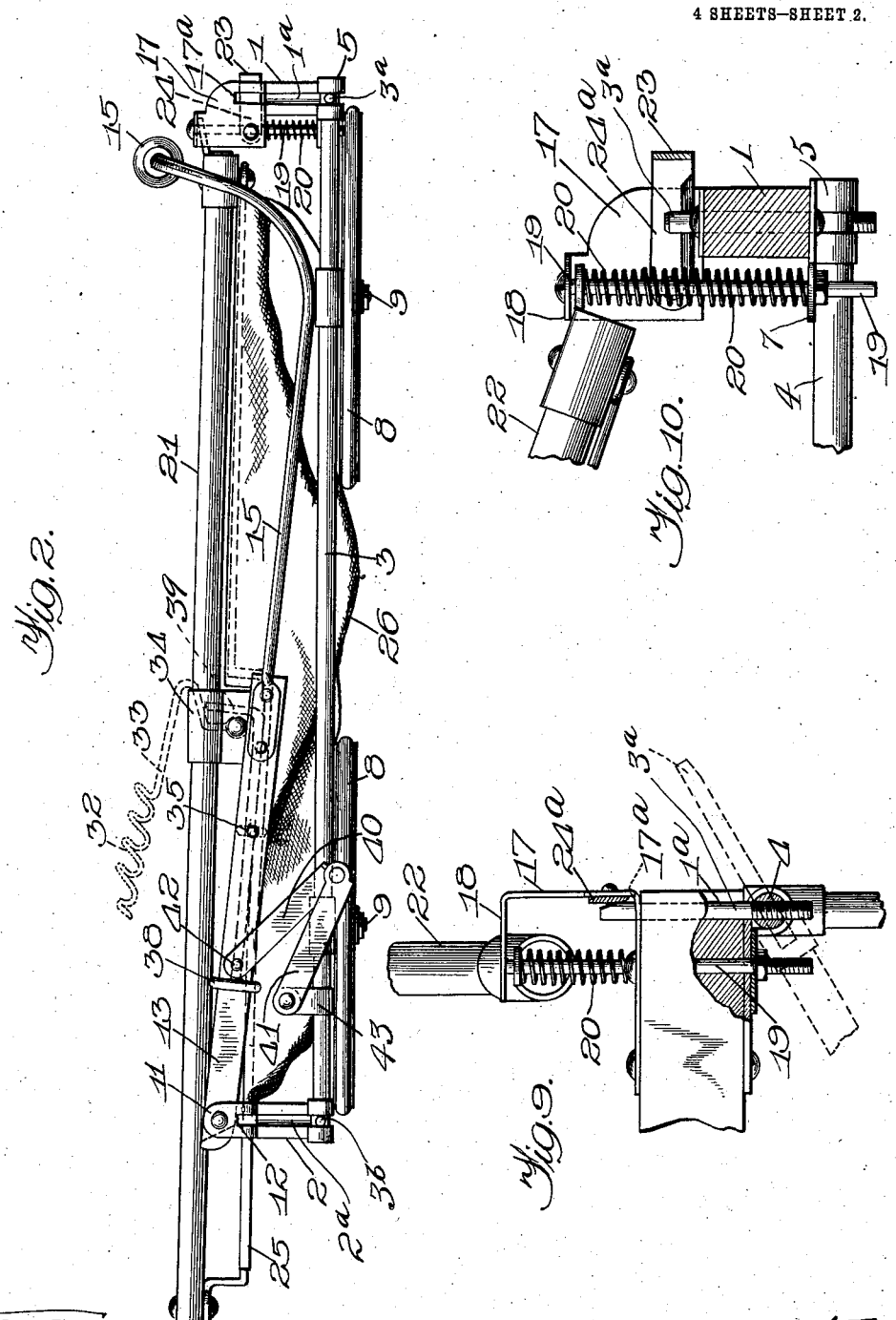
Figure 3:
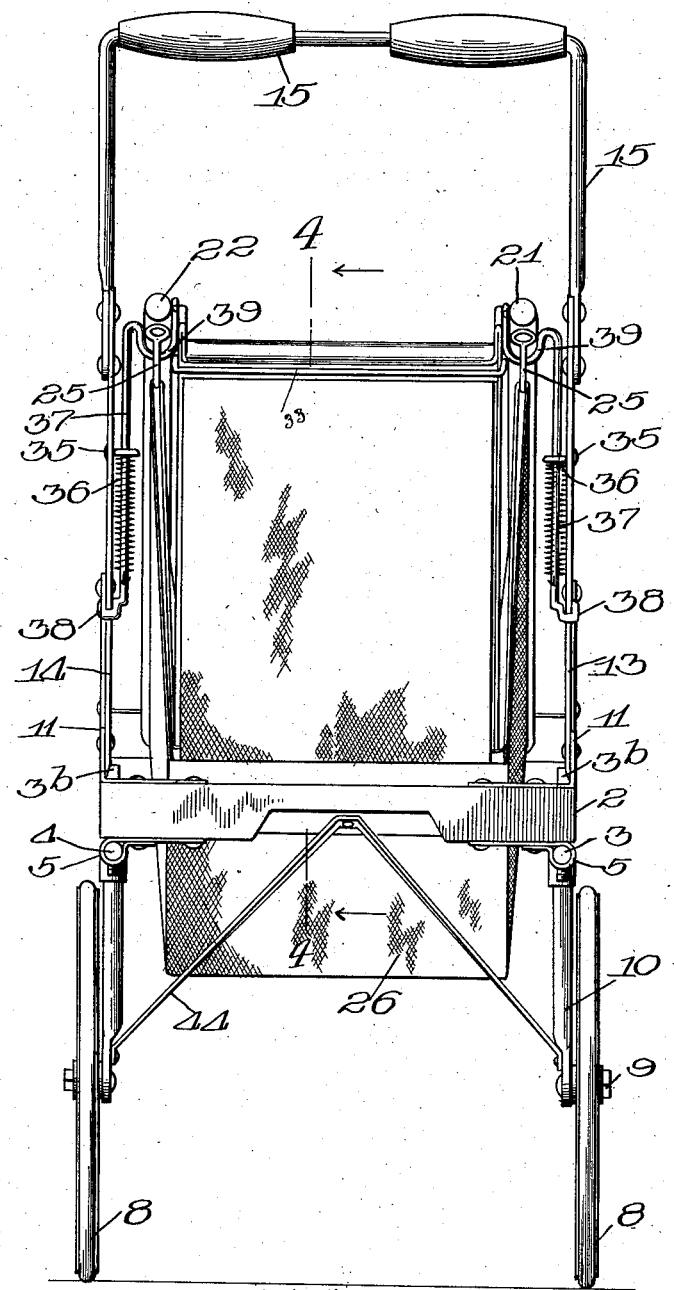
Figure 11:
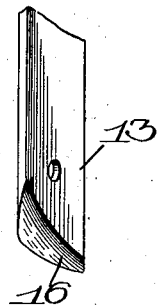
Figure 12:
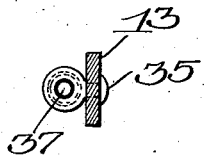
Figure 13:
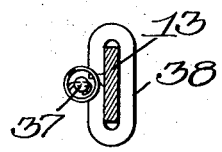

In the drawings, Figure 1 is a side elevational view of a vehicle constructed in accordance with my invention, the parts being in set-up position. Fig. 2 is a similar view of the vehicle collapsed. Fig. 3 is a rear view of the vehicle. Fig. 4 is an enlarged vertical section on line 4 4 of Fig. 3 through the rear portion of the vehicle, showing the rear wheel-support lock and the rear body-supporting means. Fig. 5 is an edge view of the vehicle body support. Fig. 6 is a detail view of the wheel-support lock. Fig. 7 is a detail perspective view of the bearing for the wheel-support. Fig. 8 is a fragmental plan view of the front end bar of the vehicle frame, and of the bail for locking the front portion of the wheel-support in operative position. Fig. 9 is a view partly in section and partly in elevation of the wheel-supporting bar, its lock and the resilient support for the vehicle body. Fig. 10 is a side view of the same. Fig. 11 is an enlarged detail view of the end of one of the rock-shaft-locking levers. Fig. 12 is a cross-sectional view through the rocking bars, a body supporting spring anchor being shown in plan, and Fig. 13 is a similar view through the rock bars, showing the guiding portion of the body support in elevation.

I have shown but one embodiment of my invention in the accompanying drawings, and that may consist of a body supporting frame, comprising the front and rear bars 1 and 2, connected together by the longitudinal rock shafts 3 and 4. The rock shafts 3 and 4 are journaled in bearings 5, of which there is one at each corner of the rectangular frame formed by the end bars and rock shafts. The bearings at the front end of the vehicle each comprise a plate 6 bent back upon itself to form a journal bearing for the reception of one of the rods 3 or 4 (see Fig. 7). Extending from one edge of each of the plates is a tongue or projection 7 provided with an opening to receive a guide rod for one of the front springs of the vehicle body, to be described hereinafter. The respective journals are secured to the front or rear bars by suitable fastening devices and the rear journals also have approximately the same construction as those attached to the front bar, save that the rear journals are devoid of the extension 7. The ends of the end bars 1 and 2 are bifurcated or slotted and the slots in the bar 1 are designated by the numeral 1ª while those in the bar 2 are designated by the numeral 2ª. Pins or fingers, rigid with the respective rock shafts, are attached to lie in the grooves 1ª 2ª at respective ends of the end bars 1 and 2 and these pins may be engaged by suitable locking devices so as to hold the rock shafts against rotative movement. These pins are designated as 3ª for the front pins and 3ᵇ for the rear pins. It is to be understood that the rock shafts carry the wheels 8. These wheels are mounted on the axles 9 on the depending arms 10 suitably fixed to said rock shafts. Thus it is apparent that when the rock shafts are swung on their journals the wheels will be caused to swing into collapsing position or the operative position, according to the will of the operator.

On the rear bar 2 are two end brackets designated 11, and each bracket is provided with an upstanding lip or projection having a slot 12 therein registering with the groove in the adjacent end of the end bar which supports it. The purpose of providing the slot in the bracket is to permit one of the pins carried by the rock shafts to pass through said slot so as to permit the insertion of a locking member between its particular pin and the inner face of the adjacent bracket, so as to hold the rock shaft against movement. The locking means herein shown for the rear pins consists of two pivoted levers 13 and 14, one of which is pivoted to a bracket at one end of the rear bar and the other is pivoted to a bracket at the opposite end of the rear bar; the two upper ends of the respective levers 13 and 14 being connected to and forming part of the handle 15 used for propelling the vehicle (see Fig. 3). The ends of the levers 13 and 14, below their pivotal points, are chamfered on one face and curved at their ends so as to form substantially knife edges or inclined faces 16 so that when properly manipulated the insertion of the inclined face between the pin on the rock shaft and the bracket face will have a wedging effect, that is to say, the space between the pin and the adjacent face of the bracket will be filled, so as to prevent any play of the pins with the consequent movement of the rock shafts. The similar pins 3ª at the front ends of the respective rock shafts fit in the grooves 1ª in the respective ends of the front end bar 1, and these pins are adapted to pass through slots 17ª in the brackets 17, there being one at each end of the bar 1. The brackets 17 are provided with horizontal in-turned lips 18, which, together with the extension 7, form supports for the guide rods 19 around which are coils of compression springs 20, one end of each of which rests upon an extension 7. The other end of each spring bears against an end of one of the side bars 21 or 22 of the body, so that the compression springs will constitute cushions to resiliently support the forward portion of said body. The brackets 17 also support a pivoted bail 23, having pin engaging arms or levers 24 and 24ª. The nether edges of the lever arms 24 and 24ª are chamfered or wedge shaped in cross section to wedge in and take up the spaces between the pins 3ª and the sides of the brackets 17. It will be apparent then that the rock shafts are provided with front and rear locks and any tendency of the shafts to turn while the vehicle is being used will be resisted at the front and rear ends of the vehicle.

As heretofore stated, the sling or body of the vehicle consists in part of the side bars 21 and 22. These side bars carry the longitudinal rods 25, to which the side edges of the flexible body portion 26 are attached; the front of said flexible body portion being fastened to a transverse bar 27. The flexible body portion 26 may consist of a double fabric and of suitable form. In the rear of the body portion I may provide a rigid seat 28 to the rear side edges of which I may fasten a pivoted back 29, which may be adjusted to various positions when the vehicle is set up for use or entirely thrown down within the body portion when the vehicle is collapsed. The side bars forming a part of the back frame are provided with pins 30, interchangeable in the openings 31 in said frame 29 and these pins are adapted to engage hooks 32 on the side bars of the sliding bail 33, the ends of which are connected to the sleeves 34, one on each of the bars 21 and 22. The locking bars 13 and 14 are provided with spring anchors 35, which may consist of a pin having an eye therein, the eye engaging between certain coils of the spring 36 to make one end thereof fast. The lower end of each spring is fastened to a longitudinally movable rod 37 (Figs. 4 and 5), having its lower end bent in the form of a loop 38 to surround the locking bar on which it slides. The opposite or upper ends of the rods 37 project through the springs and are bent to form terminal stirrups 39, each to receive the rear end of one of the rods 21 or 22.

It will be observed that the springs 36 are tension springs so that the stirrups 39 will be depressed when weight is applied to the vehicle body and the rear springs will be put under tension while the forward springs will be put under compression. The use of tension and compression springs in the manner illustrated is conducive to ease in riding and assists in the proper balancing of the vehicle body. When the vehicle is collapsed, the back 29 is swung forwardly and downwardly to lie upon the seat 28. The handle 15 is then swung forwardly, the stirrups 39 on said handle sliding before them the sleeves 34 which carry the bail 33. In the operation of setting up the vehicle, after the handle 15 has been swung into operative position the back 29 is swung upwardly and rearwardly into position, said back in this movement engaging the supporting bail 33 and sliding the sleeves 34 along the side bars 21 and 22 into their rearmost position. In order to brace the locking and handle bars when the vehicle is set up, I have provided the braces comprising the toggles 40 and 41. One end of one toggle is connected to a lock bar at 42 and the other to a sleeve on the rock shaft at 43, the two toggles being connected together by a rule joint. Thus when the handle 15 and the two locking bars are swung up into position, the braces will hold the handle against accidental collapse. In order to prevent longitudinal movement of the sleeves 43 along the rock shafts 3 and 4 and at the same time permit relative rotation of said sleeves and shafts, any common or suitable means may be provided, such as annular recesses 43ª in the peripheries of the rock shafts, in which recesses the sleeves 43 lie. The bolts which connect the toggles to the lock bars also serve as stops to limit the upward movement of the loop guides 38, so that the tension springs will only be effective in imparting a limited longitudinal movement to the rod 37. In order to prevent the seat 28 from being raised, due to vibration caused by the passage of the vehicle over an uneven surface, I have provided stay straps 44 which may be secured to the bottom of the seat and to the rear wheel-arms 10.

I claim as my invention:

1. In a collapsible vehicle, a base frame having grooved end bars and rocking side bars, projections on the side bars and positioned to enter the grooves in the end bars, and locking members on the end bars to retain said projections in the grooves.

2. In a collapsible vehicle, a base frame, and a body, a resilient pivotal connection between the body and the base at one end of the vehicle, and a pivoted handle at the opposite end of the vehicle having a spring hung body support.

3. In a collapsible vehicle, a base frame, having rocking side bars provided with transverse pins, brackets on the frame having openings through which the pins may project, and locking members movable into positions between the pins and the brackets.

4. In a collapsible vehicle, a base frame having rocking side bars provided with transverse pins, brackets upon the base frame, and having slots through which the pins may project, and pivoted locking devices carried by the brackets and movable between the pins and the brackets to prevent movement of said side bars.

5. In a collapsible vehicle, a base frame having rocking side bars provided with transverse pins, brackets upon the base frame, and having slots through which the pins may project, and pivoted locking devices having wedge-shaped edges, carried by the brackets and movable between the pins and the brackets to prevent movement of said side bars.

6. In a collapsible carriage, a base frame, a handle pivotally mounted thereon, a body comprising longitudinal side bars, a back hinged on said body, a back support slidable on said side bars, said back support being movable into operative position by said back, and means on said handle adapted to engage said back support in the folding movement of said handle for moving said back support and said back into inoperative position.

7. In a collapsible vehicle, a base frame, a body resiliently supported on fixed bearings at one end of the base frame to fold downwardly on said bearing against the base frame, and pivoted resilient bearings for the body at the other end of the base frame arranged to fold toward the first mentioned end of the base frame and against said base frame.

8. In a collapsible vehicle, a base frame comprising two end bars and two side bars rotatably connected with said end bars; a pin fixed to one end of each of said side bars and adapted to lie against one end of one of said end bars, and movable means carried by the last mentioned end bar and arranged to be interposed in the path of movement of said pin.

9. In a collapsible vehicle, a base frame comprising an end bar and two side bars rotatively connected with said end bar; a pin fixed to one end of each of said side bars and arranged to lie against one end of said end bar; and a bail pivotally supported on said base frame, the side arms of said bail being arranged to be interposed in the path of movement of said pins.

10. In a collapsible vehicle, a base frame comprising two end bars, each provided at its ends with bearings; two side bars journaled in said bearings; a pin fixed to each end of each of said side bars and arranged to lie in a groove in the end of the adjacent end bar, and means for locking each pin in its groove.

11. In a collapsible vehicle, a base frame comprising an end bar and two side bars rotatably connected with said end bar; a pin fixed to each side bar and arranged to lie against one end of said end bar; brackets on said end bar; a handle pivotally connected with said brackets; and parts connected with said handle and arranged to hold said pins against said end bar.

12. In a collapsible vehicle, a base frame; a handle pivoted to said base frame; means for limiting pivotal movement of the handle; and a seat frame attached at its forward end to the base frame, said handle having a sliding connection with said seat frame and supporting said seat frame.

13. In a collapsible vehicle, a base frame; a handle pivoted to said base frame; means for limiting pivotal movement of the handle; two body-supporting bars supported at their forward ends by the base frame and yieldingly mounted members carried by said handle upon which the rear ends of said bars are supported, said members being adapted to slide along said bars.

14. In a collapsible vehicle, a base frame; a handle pivoted to said base frame; means for limiting pivotal movement of the handle; a seat frame attached at its forward end to the base frame; said handle comprising two side portions; a rod slidably mounted upon each of said side portions and yieldingly supported on said side portions; and a stirrup at the upper ends of said rods to receive the rear end of said seat frame, said stirrups being adapted to slide along said seat frame.

15. In a collapsible vehicle, a base frame and a seat frame arranged to fold together; a back movably supported at its lower end by said seat frame; a bail mounted upon the seat frame to slide longitudinally thereof and arranged to support the upper part of said back, the side arms of said bail providing hooks; and projections on said back arranged to lie in said hooks.

16. In a collapsible vehicle, a base frame; a handle pivoted to the rear end of said base frame and arranged to fold forward and down against the base frame; compression springs supported by the forward end of said base frame; a seat frame supported at its forward end by said compression springs and arranged to fold downwardly into a plane substantially parallel with the base frame; and tension springs carried by said handle and serving to support the rear end of said seat frame.

17. A collapsible vehicle comprising a base frame; vertical rods carried by said base frame; coiled springs surrounding said rods; a seat frame, the forward end of which is slidably and pivotally mounted on said rods and supported by said springs; and suitable means for supporting the rear end of said seat frame.

18. In a collapsible vehicle, a base frame having grooved end bars and rocking side bars, projections on the side bars positioned to enter the grooves in the end bars, brackets on said base frame having slots through which said projections may pass, and locking members pivoted on said brackets and movable into position between said projections and said brackets to lock said projections in said grooves.

19. In a collapsible vehicle, a base frame, a swinging wheel support, a projection on said wheel support, a bracket on said base frame, said bracket having a slot therein through which said projection is adapted to pass, and a handle pivoted on said bracket and having a part movable into position between said bracket and said projection for locking said wheel support against movement.

20. In a collapsible vehicle, a base frame comprising end bars, bearings at the end of said bars, the bearings at one end of said base frame having ears thereon, side bars journaled in said bearings, pins fixed to said side bars and arranged to lie against the ends of said end bars, brackets at the ends of one of said end bars, a bail pivotally mounted on said brackets and arranged to hold said pins against the ends of said last mentioned end bars, rods fixed in said brackets and the ears on said bearings, coiled springs surrounding said rods, and a seat frame, one end of which is slidably mounted on said rods and supported by said springs.

FREDRICK KAPLAN.

Witnesses:
ERNEST U. SCHROETER,
LUTHER L. MILLER.

Copies of this patent may be obtained for five cents each, by addressing the "Commissioner of Patents, Washington, D. C."